United States Patent
Dore et al.

(10) Patent No.: US 9,800,046 B2
(45) Date of Patent: Oct. 24, 2017

(54) SWITCH ASSEMBLY FOR USE IN A POWER TRANSMISSION SYSTEM

(71) Applicant: ABB SCHWEIZ AG, Baden (CH)

(72) Inventors: Erik Dore, Ludvika (SE); Ola Jeppsson, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/326,136

(22) PCT Filed: Jul. 16, 2014

(86) PCT No.: PCT/EP2014/065200
§ 371 (c)(1),
(2) Date: Jan. 13, 2017

(87) PCT Pub. No.: WO2016/008515
PCT Pub. Date: Jan. 21, 2016

(65) Prior Publication Data
US 2017/0201089 A1  Jul. 13, 2017

(51) Int. Cl.
*H04B 3/00* (2006.01)
*H04B 15/00* (2006.01)
*H05K 9/00* (2006.01)
*H02H 7/20* (2006.01)

(52) U.S. Cl.
CPC .................................... *H02H 7/20* (2013.01)

(58) Field of Classification Search
CPC ....................................................... H02H 7/20
USPC .......................................................... 307/91
See application file for complete search history.

(56) References Cited

U.S. PATENT DOCUMENTS

| 4,831,487 A | 5/1989 | Ruoss |
| 6,937,027 B2 | 8/2005 | Koo et al. |
| 2007/0208520 A1* | 9/2007 | Zhang .................... H02H 3/335 |
| | | 702/58 |

FOREIGN PATENT DOCUMENTS

| CN | 102696087 A | 9/2012 |
| EP | 0 791 992 B1 | 7/2001 |
| EP | 2 701 254 A1 | 2/2014 |
| JP | 2010-282888 A | 12/2010 |
| WO | WO 99/36927 A1 | 7/1999 |
| WO | WO 2011/044928 A1 | 4/2011 |

(Continued)

OTHER PUBLICATIONS

English translation of the Chinese Office Action issued in Chinese Application No. 201480080607.3, dated Jul. 4, 2017.

*Primary Examiner* — Carlos Amaya
(74) *Attorney, Agent, or Firm* — Birch, Stewart, Kolasch & Birch, LLP

(57) ABSTRACT

A switch assembly is disclosed for use in a circuit configured to carry a current between a first electrical conductor and a second electrical conductor. The switch assembly includes at least a first current path and a second current path, each of which includes an electrical contact which can be selectively connected to or disconnected from the second electrical conductor. At least one of the first current path and the second current path is configured such that it has a frequency-dependent reactance or impedance so as to force or cause current with a frequency which complies with a selected frequency criterion and which flows between the first electrical conductor and the second electrical conductor to flow, at least to a greater extent, via a selected one of the first current path and the second current path.

20 Claims, 4 Drawing Sheets

(56) References Cited

FOREIGN PATENT DOCUMENTS

WO    WO 2012/061960 A1    5/2012
WO    WO 2013/185815 A1    12/2013

* cited by examiner

SWITCH ASSEMBLY FOR USE IN A POWER TRANSMISSION SYSTEM

TECHNICAL FIELD

The present invention generally relates to the field of power systems such as electrical power distribution or transmission systems, e.g. High Voltage Direct Current (HVDC) power transmission systems. Specifically, the present invention relates to a switch assembly for use in a circuit between a first electrical conductor and a second electrical conductor, the circuit being configured to carry a current between the first electrical conductor and the second electrical conductor.

BACKGROUND

Power systems such as electrical power distribution or transmission systems are used to supply, transmit and use electric power. High Voltage Direct Current (HVDC) power transmission is becoming increasingly important due to increasing need for power supply or delivery and interconnected power transmission and distribution systems. Power systems such as electrical power distribution or transmission systems generally include a protection system for protecting, monitoring and controlling the operation and/or functionality of other components included in the power system, which other components hence may be referred to as protected units. Such protection systems may for example be able to detect short circuits, overcurrents and overvoltages in power lines, transformers and/or other parts or components of the power system. The protection systems can include protection equipment such as circuit breakers for isolating any possible faults for example occurring in power transmission and distribution lines by opening or tripping the circuit breakers. After the fault has been cleared, e.g. by performing repairs and/or maintenance on the component in which the fault has been detected, the power flow can be restored by closing the circuit breakers. In alternative or in addition the protection systems can be arranged to, upon detection of a fault in a particular route for power flow (e.g. in a certain component arranged in that route), isolate the route in which the fault has been detected and select an alternative route for the power flow, for example by means of a so called bypass switch which when closed may route the power flow so as to bypass the route in which the fault has been detected.

An HVDC converter station is a type of station configured to convert high voltage direct current (DC) to alternating current (AC) or the reverse. An HVDC converter station may comprise a plurality of elements such as the converter itself (or a plurality of converters connected in series or in parallel), an alternating current switch gear, transformers, capacitors, filters, a direct current switch gear and/or other auxiliary elements. Electronic converters may comprise a plurality of solid-state based devices such as semiconductor devices and may be categorized as line-commutated converters, using e.g. thyristors as switches, or voltage source converters, using transistors such as insulated gate bipolar transistors (IGBTs) as switches (or switching devices). A plurality of solid-state semiconductor devices such as thyristors or IGBTs may be connected together, for instance in series, to form a building block, or cell, of an HVDC converter, which may also be referred to as an HVDC converter valve.

According to one example, a plurality of solid-state semiconductor devices such as thyristors or IGBTs may be connected in series in a cell of an HVDC converter. During normal operation of e.g. an HVDC power transmission system or an HVDC grid including the HVDC converter, the solid-state semiconductor devices in the HVDC converter may at times be in a conducting mode in which they are conducting current and at other times be in a blocking mode, in order to attain a desired or required wave form of the current, as known in the art. This may expose the solid-state semiconductor devices to continuous current stresses, which especially in HVDC applications may be relatively high. If any one of the solid-state semiconductor devices would fail or malfunction, e.g. due to continuous current stresses, the current through the HVDC converter would be interrupted, and repairs and/or replacement of any failed solid-state semiconductor device might then become necessary in order to put the HVDC converter back into operation. In a HVDC converter station based on voltage source converters there may be DC capacitors, or DC capacitor banks, which act as voltage sources and which are connected to, for instance in parallel, one or several solid-state semiconductor devices such as IGBTs included in a cell of an HVDC converter.

SUMMARY

If a protection system in the HVDC power transmission system detects a failure of one of the solid-state semiconductor devices, it may trigger closing of a bypass switch arranged in a bypass circuit, arranged for routing the power flow so as to bypass the failed solid-state semiconductor device. Closing of the bypass switch may cause short-circuiting of a DC capacitor or DC capacitor bank connected to the failed solid-state semiconductor device, upon which the DC capacitor or DC capacitor bank may discharge. In HVDC applications currents generated by discharge of such DC capacitors or DC capacitor banks may be thousands of kA or even higher. In the following such currents generated by discharge of such DC capacitors or DC capacitor banks may be referred to as short-circuiting currents. Such bypass switches may for example be employed in HVDC converter cells. A challenge in constructing or implementing such a bypass switch is to make it able to withstand short-circuiting currents, which hence may be relatively large, e.g., thousands of kA or even higher in HVDC applications. Such high currents may lead to failure of the contacts in the bypass switch due to high temperatures caused by the high currents. Such short-circuiting currents often have a transient behavior. If the circuit is not critically damped, the short-circuiting current resonant frequency will be $f_0=(2\pi)^{-1}(LC)^{-1/2}$, where L is the inductance of the current path into which the short-circuiting current is discharged and C is the capacitance of the DC capacitor(s) or DC capacitor bank(s). This may entail that the short-circuiting current will act in the kHz frequency range and last for a period of time in the millisecond range before the energy in the DC capacitor(s) or DC capacitor bank(s) is exhausted.

In particular, relatively large, possibly abnormal currents which are discharged through a switch or switch assembly may lead to failure of the 'main' electrical contacts in the switch due to high temperatures caused by the high currents. One technique for dealing with large short-circuiting currents such as described in the foregoing includes deflecting the short-circuiting current from the 'main' electrical contact(s) in the bypass switch.

In view of the above, a concern of the present invention is to provide a switch, or switch assembly, which mitigates or alleviates or even eliminates failure of 'main' electrical contact(s) in the switch or switch assembly caused by relatively large, possibly abnormal currents which are expected or even required to be discharged through the switch or switch assembly.

To address at least one of this concern and other concerns, a switch assembly in accordance with the independent claim is provided. Preferred embodiments are defined by the dependent claims.

It is to be understood that even though reference may be made in the description herein to the switch or switch assembly as a bypass switch, this is not to be construed as limiting any embodiments of the present invention, and that use of the switch assembly as or in a bypass switch is according to an example. Embodiments of the present invention encompass switches or switch assemblies in general, particularly in applications where relatively large, possibly abnormal currents are required or expected to be discharged through the switch or switch assembly.

Embodiments of the present invention are based on the above-mentioned technique of deflecting the short-circuiting current from the 'main' electrical contact(s) in the bypass switch. According to the embodiments of the present invention, the bypass switch comprises a first electrical conductor and a second electrical conductor arranged in a current path which in accordance with the discussion above for example may be used for bypassing one or several solid-state semi-conductor devices such as IGBTs included in a cell of an HVDC converter, or for bypassing another unit that may fail or malfunction.

The inventors have realized that for dealing with large short-circuiting currents such as described in the foregoing in the bypass switch it may be utilized that the short-circuiting current, which as mentioned above may be thousands of kA or even higher in HVDC applications, has a relatively high frequency, whereas the 'main' current, which flows after the short-circuiting current has ceased flowing, in general has a frequency that is lower, or even significantly lower, compared to the frequency of the short-circuiting current. According to an example relevant for HVDC, short-circuiting currents may have a frequency of one or several kHz or higher, whereas the 'main' current may have a frequency of about 100 Hz.

According to an embodiment of the present invention there are arranged at least two current paths 'between' the first electrical conductor and the second electrical conductor. One current path goes from the first electrical conductor to an electrical 'pre-contact' and the other current path goes from the first electrical conductor to an electrical 'main contact'. The pre-contact and the main contact may each be connected to the second electrical conductor by means of a conductive member, which may be movable, in a manner which will be described further in the following.

According to an embodiment of the present invention, the bypass switch is arranged such that, for a short-circuiting current with a relatively high frequency, the current path from the first electrical conductor to the main contact has a higher reactance than the current path from the first electrical conductor to the pre-contact. This is utilized in order to force the short-circuiting current to flow via the pre-contact to the second electrical conductor until the frequency of the current is sufficiently reduced, i.e. when the short-circuiting current has ceased flowing (typically within a period of time in the millisecond range), at which the current instead can flow via the main contact to the second electrical conductor by virtue of a lower reactance for the current in the current path from the first electrical conductor to the main contact compared to in the current path from the first electrical conductor to the pre-contact. This can be achieved for example by having an inductor with a frequency-dependent impedance, i.e. inductive reactance, in the current path from the first electrical conductor to the main contact. The relatively high frequency (f) of the short-circuiting current means that a relatively high impedance ($X \sim f \cdot L$, where L is the inductance of the inductor; L may be configurable and/or adjustable) is created for the short-circuiting current in the current path in which the inductor is arranged. Frequency-dependent impedance can in alternative or in addition be achieved for example by means of the current path from the first electrical conductor to the main contact having a certain shape, length and/or cross section, e.g. having the form of a pipe, a substantially flat strip (rectangular cross section), etc.

By forcing the short-circuiting current to flow to the second electrical conductor via the pre-contact, or via an arc between the pre-contact and the second electrical conductor, the main contact may be spared from the short-circuiting current. By sparing the main contact from the short-circuiting current, failure or reduced performance or capacity of the main contact, e.g. due to high temperatures caused by the high short-circuiting current, may be mitigated or even eliminated.

It is envisaged that a bypass switch according to embodiments of the present invention can be used for example in applications with relatively high current requirements, such as may be the case in HVDC applications. In such and other application the pre-contact in accordance with embodiments of the present invention may be a one-time use component, which may be replaced after each use of the bypass switch. However, for example by making the pre-contact in a material capable of withstanding relatively high temperatures, including material such as tungsten or wolfram (W), the pre-contact may possibly be used (i.e. a relatively large current being discharged through it) repeatedly.

According to a first aspect of the present invention there is provided a switch assembly, or switch arrangement, for use in a circuit between a first electrical conductor and a second electrical conductor, the circuit being configured to carry a current between the first electrical conductor and the second electrical conductor. The current has a frequency which may vary. The switch assembly is arranged, or configured, such that the first electrical conductor and the second electrical conductor can be selectively connected and disconnected, such that when the first electrical conductor and the second electrical conductor are disconnected, current therebetween is interrupted, and when the first electrical conductor and the second electrical conductor are connected, current may flow therebetween. The switch assembly comprises at least a first current path and a second current path. Each of the first current path and the second current path includes an electrical contact which can be selectively connected to or disconnected from the second electrical conductor so as to permit current flowing between the first electrical conductor and the second electrical conductor to flow via one or both of the first current path and the second current path. At least one of the first current path and the second current path is arranged, or configured, such that it has a frequency-dependent reactance or impedance so as to cause or force current with a frequency which complies with a selected frequency criterion and which flows between the first electrical conductor and the second electrical conductor to flow, at least to a greater extent, via a selected one of the first current path and the second current path.

For example, an increased reactance or impedance in one of the first current path and the second current path in comparison to the other of the first current path and the second current path, or a difference between reactance or impedance in the first current path and reactance or impedance in the second current path, when the current has a relatively high frequency can be utilized to cause or force current to flow via the other of the first current path and the second current path, at least as long as the current has a relatively high frequency.

For example, by causing or forcing current with a frequency which complies with a selected frequency criterion and which flows between the first electrical conductor and the second electrical conductor to flow (at least to a greater extent) via a selected one of the first current path and the second current path, a relatively large current, having a relatively large frequency, can be deflected or routed into that one of the first current path and the second current path that may be the most appropriate. As described in the foregoing, in order to force the current to flow (at least to a greater extent) via a selected one of the first current path and the second current path, at least one of the first current path and the second current path can be arranged or configured such that it has a frequency-dependent reactance or impedance. To this end, an inductor with a frequency-dependent reactance or impedance may be arranged in one or both of the first current path and the second current path. In alternative or in addition one or both of the first current path and the second current path may be configured or arranged so as to exhibit a certain shape, length and/or cross section, e.g. having the form of a pipe, a flat strip (rectangular cross section), etc., as known in the art. As indicated in the foregoing, the switching assembly may for example be used in a bypass circuit for bypassing a short-circuiting current or another abnormal current, which may have been generated by discharge of a capacitor or another electrical component used to store energy electrostatically in an electric field, from a bypassable unit or cell. The bypassable unit or cell may not be able to withstand the short-circuiting current or abnormal current.

As mentioned above, short-circuiting currents often have a transient behavior. If the circuit is not critically damped, the short-circuiting current resonant frequency will be $f_0 = (2\pi)^{-1}(LC)^{-1/2}$, which may entail that the short-circuiting current will act in the kHz frequency range and last for a period of time in the millisecond range. This behavior of short-circuiting currents can hence be used, by appropriately arranging or configuring the reactance or impedance of the first current path and/or the second current path so as to achieve a difference in reactance or impedance between the first current path and the second current path for a high-frequency, short-circuiting current discharged through the switch assembly, in order force the short-circuiting current to flow via a selected one of the first current path and the second current path.

The most appropriate one of the first current path and the second current path may be the current path which does not include the 'main' electrical contact(s) in the switch assembly. For instance, the electrical contact of the second current path may be considered as a 'main contact' of the switch assembly whereas the electrical contact of the first current path may be considered as a 'pre-contact' of the switch assembly. It may in some applications be preferred that any possible damage of the electrical contact(s) in the switch assembly that may occur, e.g. due to high temperatures caused by a relatively large current, is restricted, or substantially restricted or to most part restricted, to the pre-contact, and that any damage to the main contact is mitigated or even eliminated. For example, it may be desirable or even be required for the main contact to be able to carry current during a relatively long period of time, which in some applications may be up to one or more years. Damage to the main contact which impairs its function may in some situations degrade functionality or capacity of portions or even the whole of a power system in which the main contact is included. According to another example, the main contact may be more expensive and/or more difficult to replace compared to the pre-contact. A relatively large current, having a relatively large frequency, may then be deflected into the current path with the pre-contact, and the main contact may be spared from the relatively large current. By sparing the main contact from the relatively large current failure or reduced performance or capacity of the main contact may be mitigated or even eliminated.

The selected frequency criterion may for example comprise the frequency exceeding a predefined frequency. When the current falls below the predefined frequency it may hence not comply with the selected frequency criterion. When the short-circuiting current may have ceased such that the current has a frequency which no longer complies with the selected frequency criterion, the current may flow via one or both the first current path and the second current path, or via one or both of the main contact and the pre-contact, depending on the reactance of the first current path and the second current path, respectively, at that point.

According to a second aspect of the present invention there is provided a power transmission system comprising at least one bypassable unit (i.e. a unit capable of being electrically bypassed) and a circuit arranged so as to selectively electrically bypass the at least one bypassable unit. The circuit comprises a first electrical conductor, a second electrical conductor and a switch assembly according to the first aspect of the present invention, arranged between the first electrical conductor and the second electrical conductor. The circuit is configured to carry a current between the first electrical conductor and the second electrical conductor, which current has a frequency which may vary.

The bypassable unit may for example include one or several solid-state semiconductor devices such as IGBTs included in a cell of an HVDC converter, or a plurality of electrically connected cells. In case of failure of or malfunction in the bypassable unit, by electrically bypassing the bypassable unit a 'main' current path in the power system may be kept in operation, allowing for current to flow therethrough.

At least one of the first current path and the second current path may be arranged such that it has a frequency-dependent reactance, such that for current flowing between the first electrical conductor and the second electrical conductor having a frequency which complies with a selected frequency criterion, the selected one of the first current path and the second current path has a higher impedance compared to the other one of the first current path and the second current path.

The current flowing between the first electrical conductor and the second electrical conductor may have a frequency that varies at least during a time period.

The at least one of the first current path and the second current path may be arranged such that it has a frequency-dependent reactance, such that when the frequency of the current flowing between the first electrical conductor and the second electrical conductor does not comply with the selected frequency criterion, the current instead, or also, flows in the other one of the first current path and the second current path.

The switch assembly may comprise a movable, conductive member.

The movable, conductive member may be arranged in relation to the electrical contact of the first current path and the second current path, respectively, such that by movement of the conductive member, the electrical contact of the first current path and the second current path, respectively, can be brought into or out of contact with the second electrical conductor, so as to permit current flowing between the first electrical conductor and the second electrical conductor to flow via one or both of the first current path and the second current path.

The conductive member may be movable between a first position and a second position.

The switch assembly and/or the conductive member may be arranged or configured such that in the first position, the electrical contacts of the first current path and the second current path are both out of contact with the second electrical conductor, and in the second position, the electrical contacts of the first current path and the second current path are both in contact with the second electrical conductor.

At least one of the first current path and the second current path may be arranged such that it has a frequency-dependent reactance so as to cause or force current with a frequency which complies with the selected frequency criterion and which flows between the first electrical conductor and the second electrical conductor to flow, at least to a greater extent, via the first current path.

The conductive member may be movable into a third, intermediate position between the first position and the second position such that the electrical contacts of the first current path and the second current path are in contact with the conductive member.

On a condition that voltage between the electrical contact of the first current path and the second electrical conductor exceeds a predefined voltage level, an arc may be generated between the electrical contact of the first current path and the second electrical conductor, allowing or facilitating electrical contact between the electrical contact of the first current path and the second electrical conductor via the arc.

The power transmission system may comprise a control unit for controlling (at least) the switch assembly. To that end, the control unit may be communicatively connected to the switch assembly by means of a wired and/or wireless communication link as known in the art, for transmission of signals, commands, data, etc., therebetween.

The power transmission system may comprise a sensing unit, which may be configured to sense various parameters of the power transmission system, e.g. for facilitating or enabling control and/or protection of various elements, components or aspects of the power transmission system. Examples of such sensing units are as such known in the art. The control unit may be communicatively connected to the switch sensing unit by means of a wired and/or wireless communication link as known in the art, for transmission of signals, commands, data, etc., therebetween.

The circuit may be configured to carry a current between the first electrical conductor and the second electrical conductor, the current having a frequency which complies with the selected frequency criterion during a selected time period.

The switch assembly may be configured such that movement of the conductive member is controllable at least with respect to initiation of movement of the conductive member between the first position and the second position. Movement of the conductive member between the first position and the second position and possibly the third position with respect to the instant at which movement is initiated may hence be controlled.

For example, a relatively large short-circuiting current may be generated, which short-circuiting current may be expected to last (i.e. to continue flowing) during some period of time, e.g. during a period of time in the millisecond range. While the short-circuiting current lasts it may have a frequency which complies with the selected frequency criterion. Operation of the switch assembly such that the first electrical conductor and the second electrical conductor are connected should preferably be carried out at the instant the short-circuiting current is sensed or very shortly thereafter. The conductive member may initially be in the first position. The instant at which movement of the conductive member is initiated may be controlled such that shortly after the instant the short-circuiting current is sensed the conductive member is in the third position where the electrical contacts of the first current path and the second current path are in contact with the conductive member and where electrical contact between the electrical contact of the first current path and the second electrical conductor may be realized by means of an arc that may be generated between the electrical contact of the first current path and the second electrical conductor, so that the short-circuiting current flows via a 'pre-contact' of the switch assembly arranged in the first current path. At the end of the period of time (e.g. at the end of a period of time in the millisecond range after initiation of the movement of the conductive member) the conductive member may be in the second position such that the electrical contacts of the first current path and the second current path are both in contact with the second electrical conductor. At this stage, the short-circuiting current may have ceased such that the current has a frequency which no longer complies with the selected frequency criterion, and the current may instead flow via the main contact in the second current path to the second electrical conductor by virtue of a lower reactance for the current in the second current path compared to in the first current path (when the frequency of the current no longer complies with the selected frequency criterion).

To this end, the control unit may be configured to initiate movement of the conductive member. Initiation of movement of the conductive member may for example be triggered by receipt by the control unit of an indication or signal indicative of a failure or malfunction in the bypassable unit. The indication or signal indicative of a failure or malfunction in the bypassable unit may for example be generated and transmitted to the control unit by the sensing unit or by some protection system included in the power transmission system.

Movement of the conductive member, and possibly control of the movement of the conductive member at least with respect to initiation of movement thereof, may be implemented or realized for example by means of a so called Thomson coil or the like where the conductive member is adjacent to a coil and is subjected to a repulsive force upon application of a current pulse to the coil. The current pulse in the coil generates a varying magnetic flux, which in turn generates a current with opposite direction in the conductive member, which generates a magnetic force between the coil and the conductive member for effecting movement of the conductive member relatively to the coil. In alternative or in addition another type of electro-magnetic based actuator as known in the art may be used. In alternative or in addition a pyrotechnical actuator as known in the art may be used, e.g. where the conductive member is moved responsive to a gas quantity being released by igniting a detonator. In alternative or in addition some other appropriate actuator capable of achieving a relatively large acceleration of the conductive member may be used.

In the context of the present application, by the first electrical conductor and the second electrical conductor being disconnected and current therebetween is interrupted it means that the switch assembly is open or in an open state in the sense that the switch assembly is in a non-conductive state and conducts no current, or conducts substantially no current.

In the context of the present application, by the first electrical conductor and the second electrical conductor being connected and current may flow therebetween it is meant that the switch assembly is in a conductive or semiconductive state and conducts current.

In the context of the present application, by an electrical contact which selectively can be connected to or disconnected from an electrical conductor, or by an electrical conductor which selectively can be connected to or disconnected from another electrical conductor, it is meant not only the case where a direct electrical connection is made or exists between the respective components, e.g., by way of metallic contact, but in alternative or in addition also the case where an indirect connection is made or exists between the respective components, e.g. by way of an intermediate element or by way of or via an arc that may be generated between the respective components under certain circumstances as known in the art.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments set forth herein; rather, these embodiments are provided by way of example so that this disclosure will convey the scope of the present invention to those skilled in the art.

Figure 1:
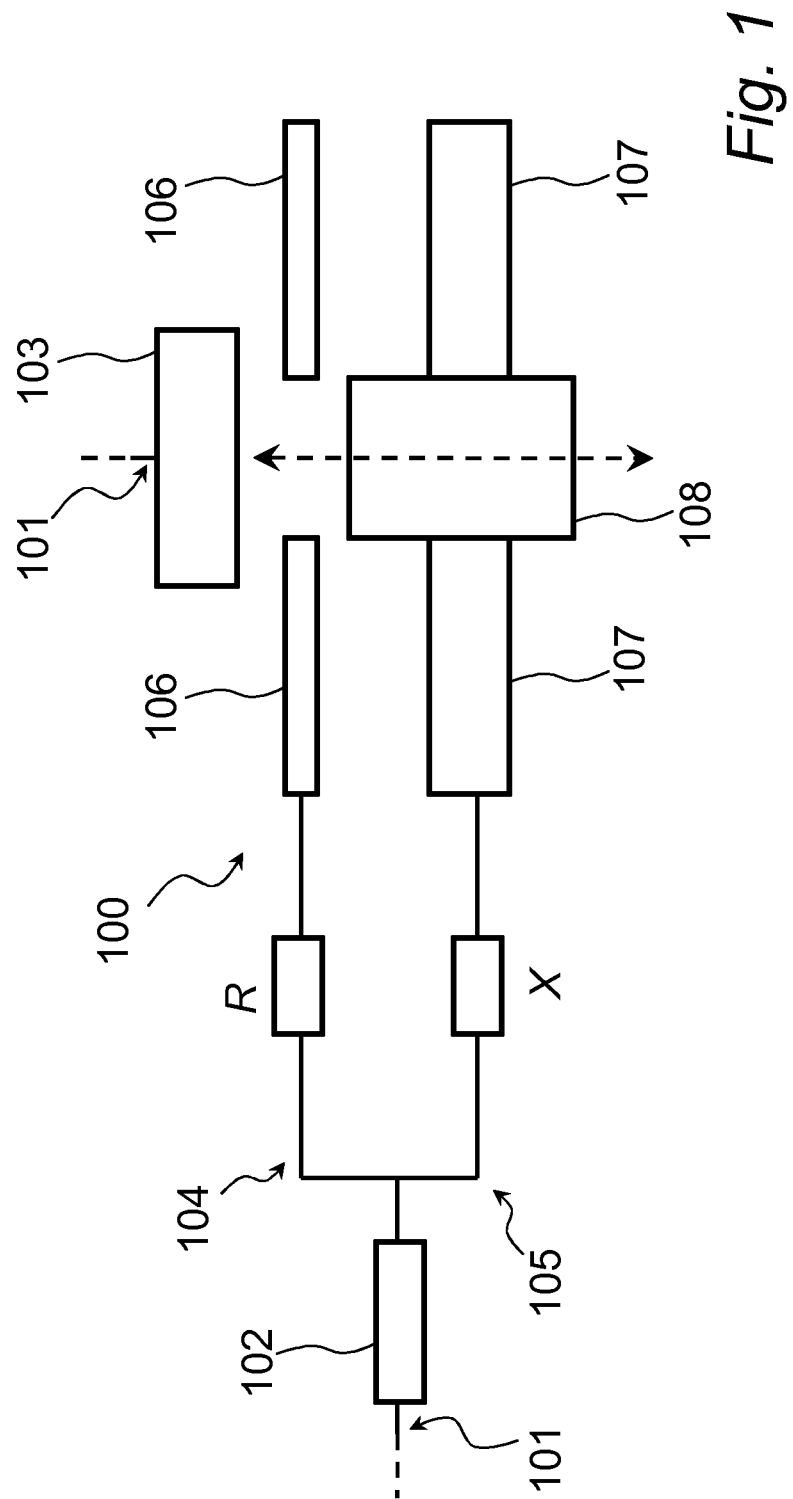
FIGS. 1-3 are schematic, sectional side views of a switch assembly according to an embodiment of the present invention.
Figure 2:
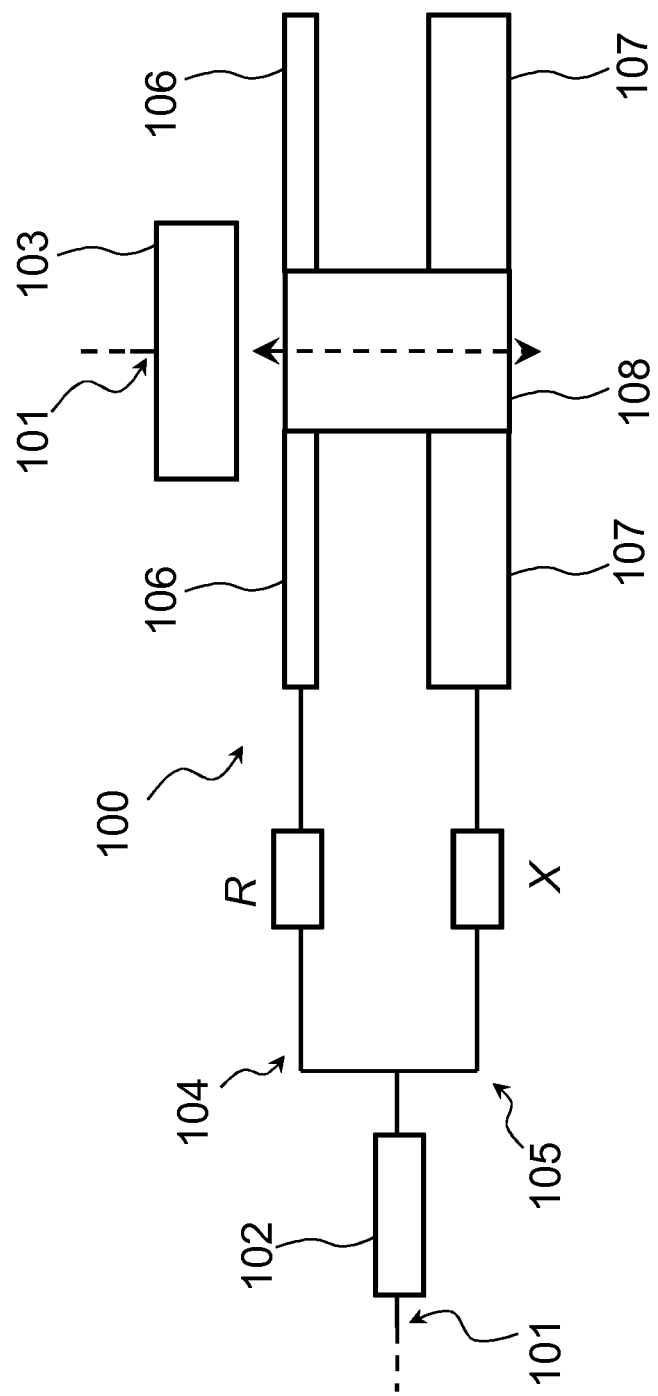
Figure 3:
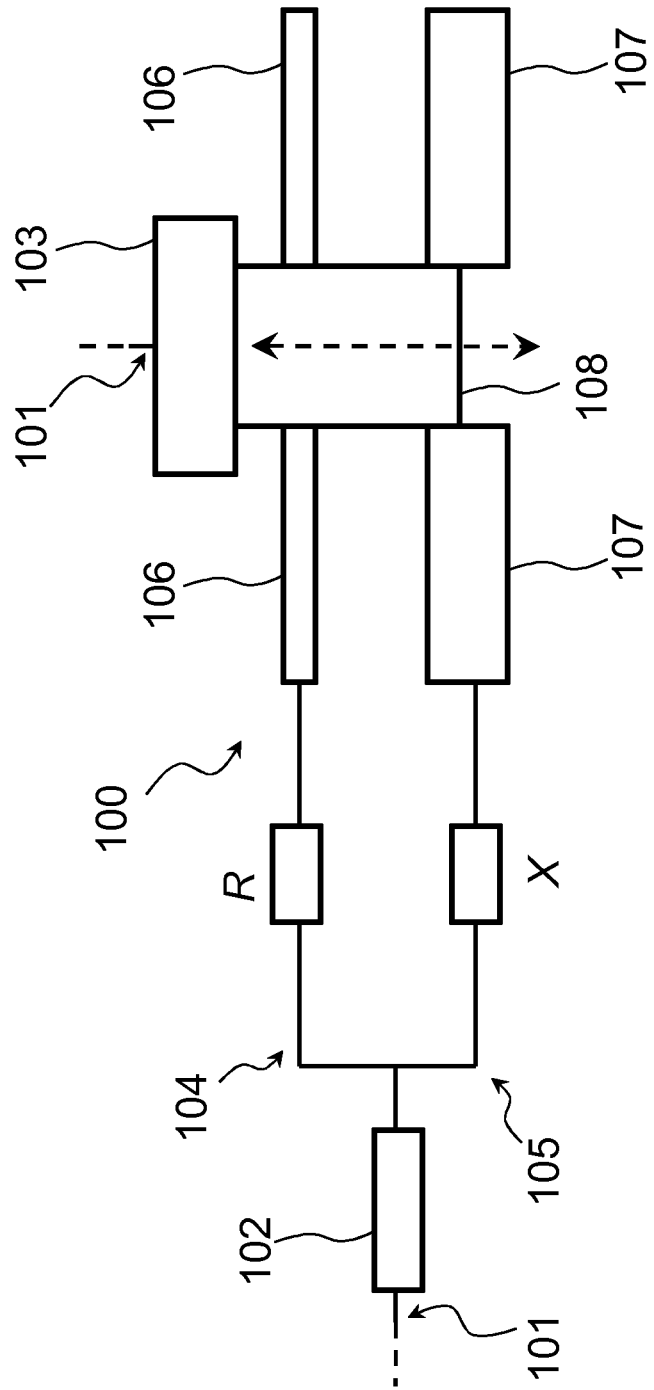

Referring now to FIGS. 1-3, there are shown schematic, sectional side views of a switch assembly 100 according to an embodiment of the present invention.

The switch assembly 100 is for use in a circuit, indicated in FIGS. 1-3 by the lines 101 which are in part dashed, between a first electrical conductor 102 and a second electrical conductor 103. The circuit 101 is configured to carry a current between the first electrical conductor 102 and the second electrical conductor 103, which current has a frequency which may vary.

The circuit 101 may for example be arranged so as to selectively electrically bypass at least one bypassable unit (not shown in FIGS. 1-3). The at least one bypassable unit may for example include one or several solid-state semiconductor devices such as IGBTs included in a cell of an HVDC converter, or a plurality of electrically connected cells.

The switch assembly 100 is arranged such that the first electrical conductor 102 and the second electrical conductor 103 can be selectively connected and disconnected such that when the first electrical conductor 102 and the second electrical conductor 103 are disconnected, current therebetween is interrupted, and when the first electrical conductor 102 and the second electrical conductor 103 are connected, current may flow therebetween.

According to the embodiment illustrated in FIGS. 1-3, the switch assembly 100 comprises a first current path and a second current path, schematically indicated by reference numerals 104 and 105, respectively.

Each of the first current path 104 and the second current path 105 includes an electrical contact 106, 107 which can be selectively connected to or disconnected from the second electrical conductor 103 so as to permit current flowing between the first electrical conductor 102 and the second electrical conductor 103 to flow via one or both of the first current path 104 and the second current path 105. This may be realized or implemented in different ways. One exemplary way is illustrated in FIGS. 1-3 and will be described further in the following.

According to the embodiment illustrated in FIGS. 1-3, the switch assembly 100 comprises a conductive member 108. The conductive member 108 is movable, which is indicated by the dashed two-way arrows in FIGS. 1-3.

As illustrated in FIGS. 1-3, the conductive member 108 is arranged in relation to the electrical contact 106, 107 of the first current path 104 and the second current path 105, respectively, such that by movement of the conductive member 108, the electrical contact 106, 107 of the first current path 104 and the second current path 105, respectively, can be brought into or out of contact with the second electrical conductor 103, so as to permit current flowing between the first electrical conductor 102 and the second electrical conductor 103 to flow via one or both of the first current path 104 and the second current path 105.

According to the embodiment illustrated in FIGS. 1-3, the electrical contacts 106, 107 and the conductive member 108 all have a cylindrical geometry. However other configurations of the electrical contacts 106, 107 and the conductive member 108, geometrical or otherwise, are possible and within the scope of the present invention.

According to the embodiment illustrated in FIGS. 1-3, the conductive member 108 is movable between a first position, illustrated in FIG. 1, and a second position, illustrated in FIG. 3. In the first position illustrated in FIG. 1, the electrical contacts 106, 107 of the first current path 104 and the second current path 105, respectively, are both out of contact with the second electrical conductor 103. In the second position illustrated in FIG. 3, the electrical contacts 106, 107 of the first current path 104 and the second current path 105, respectively, are both in contact with the second electrical conductor 103. The conductive member 108 is movable into a third position, illustrated in FIG. 2, which third position is an intermediate position with respect to the first position and the second position. In the third position illustrated in FIG. 2, the electrical contacts 106, 107 of the first current path 104 and the second current path 105 are in contact with the conductive member 108, and on a condition that voltage between the electrical contact 106 of the first current path 104 and the second electrical conductor 103 exceeds a predefined voltage level, an arc may be generated between the electrical contact 106 of the first current path 104 and the second electrical conductor 103, allowing or facilitating electrical contact between the electrical contact 106 of the first current path 104 and the second electrical conductor 103 via the arc.

Although FIGS. 1-3 illustrate that the conductive member 108 is movable along a straight path variations are possible and within the scope of the present invention. For example, the switching assembly 100 could be configured or arranged such that the path along which the conductive member 108 is movable is at least in part curved or has both straight and curved portions.

In general, at least one of the first current path 104 and the second current path 105 is arranged such that it has a frequency-dependent reactance X so as to force current with a frequency which complies with a selected frequency criterion and which flows between the first electrical conductor 102 and the second electrical conductor 103 to flow, at least to a greater extent, via a selected one of the first current path 104 and the second current path 105 (i.e. compared to the other one of the first current path 104 and the second current path 105).

According to the example embodiment illustrated in FIGS. 1-3, the second current path 105 is arranged such that it has an inductor with a frequency-dependent reactance $X=2\pi \cdot f \cdot L$, where f is the frequency (of the current) and L is the inductance of the inductor, such as to force current with a frequency which complies with the selected frequency criterion and which flows between the first electrical conductor 102 and the second electrical conductor 103 to flow, at least to a greater extent, via the first current path 104 (i.e. compared to the second current path 105). The first current path 104 has a reactance or resistance R, which in comparison to X may offer less opposition to passage of the current (having a frequency which complies with the selected frequency criterion) therethrough. Hence, that current is caused or forced to flow, at least to a greater extent, via the first current path 104. In alternative or in addition to arranging the inductor in the second current path 105, frequency-dependent impedance in the second current path 105 can be implemented or realized for example by means of the second current path 105 having a certain shape, length and/or cross section, e.g. having the form of a pipe, a substantially flat strip (rectangular cross section), etc.

Hence, for example with reference to an example where a short-circuiting current having a relatively large frequency has been generated, the relatively high frequency of the short-circuiting current means that a relatively high reactance or impedance X may be created for the short-circuiting current in the second current path 105, and therefore the short-circuiting current may be forced to flow, at least to a greater extent, to the second electrical conductor 103 via the first current path 104. Once the frequency of the current has been sufficiently reduced, e.g., when the short-circuiting current has ceased flowing (e.g. within a period of time in the millisecond range), the current may instead flow to the second electrical conductor 103 via the second current path 105 by virtue of a (at this stage) possibly lower or smaller reactance for the current in the second current path 105 compared to the first current path 104. As discussed in the foregoing, such an arrangement may for example facilitate or allow for deflecting a short-circuiting current discharged through the switch assembly 100 from the 'main' electrical contact(s) in the switch assembly 100 (which according to the present example may be arranged in the second current path 105) and instead let the short-circuiting current flow through the switch assembly 100 via 'pre-contact(s)' of the switch assembly 100 (which according to the present example may be arranged in the first current path 104). Thereby any main electrical contact(s) of the switch assembly 100 may be spared from the short-circuiting current, which may allow or facilitate for avoiding or reducing any possible damage to the main electrical contact(s), e.g., due to high temperatures caused by the short-circuiting current.

Figure 4:
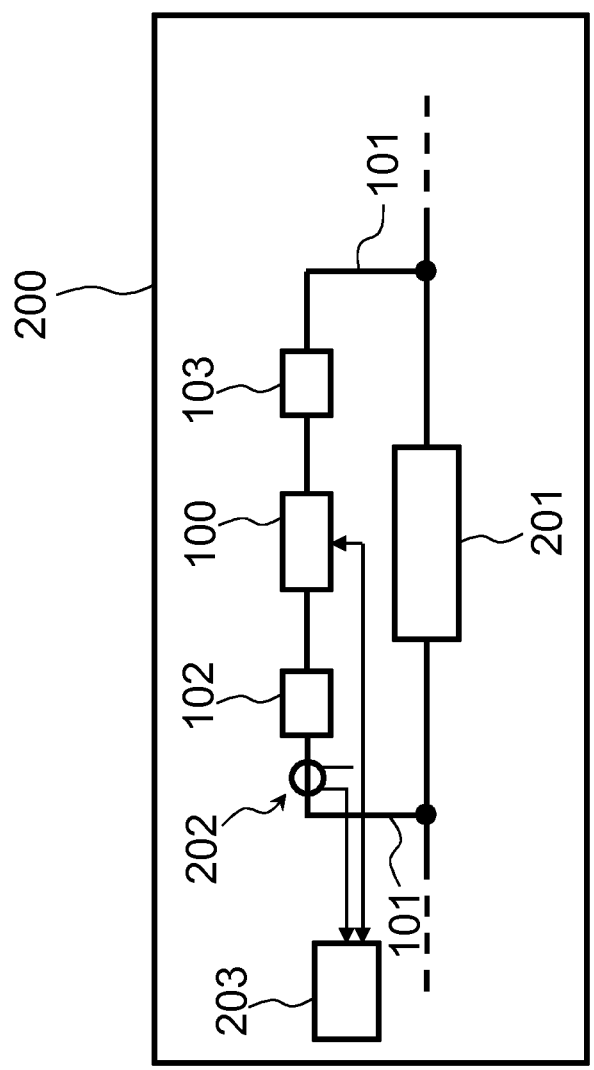
FIG. 4 is a schematic block diagram of a power transmission system according to an embodiment of the present invention.

Referring now to FIG. 4, there is shown a schematic block diagram of a power transmission system 200 according to an embodiment of the present invention. The power transmission system 200 comprises at least one bypassable unit 201 and a circuit 101 arranged so as to selectively electrically bypass the at least one bypassable unit 201. The circuit 101 comprises a first electrical conductor 102, a second electrical conductor 103 and a switch assembly 100 according to an embodiment of the present invention, e.g. such as described in the foregoing with reference to FIGS. 1-3. The switch assembly 100 is arranged between the first electrical conductor 102 and the second electrical conductor 103, and the circuit 101 is configured to carry a current between the first electrical conductor 102 and the second electrical conductor 103, which current has a frequency which may vary.

The power transmission system 200 comprises a sensing unit, schematically indicated in FIG. 4 by means of reference numeral 202, which sensing unit 202 is configured to sense at least frequency of current between the first electrical conductor 102 and the second electrical conductor 103. The location and/or arrangement of the sensing unit 202 with respect to the other components or elements of the power transmission system 200 is according to an example and variations are possible, possibly depending on which parameters of the power transmission system 200 the sensing unit 202 is configured to sense.

The power transmission system 200 comprises a control unit 203 for controlling operation of the switch assembly 100. The control unit 203 is communicatively connected to the switch assembly 100 and to the sensing unit 202 by means of a wired and/or wireless communication link as known in the art, for transmission of signals, commands, data, etc., therebetween. The control unit 203 may be configured to control various aspects or parameters related to operation of the switch assembly 100. For example, as described in the foregoing, the control unit 203 may be configured to initiate movement of the conductive member 108 (not shown in FIG. 4; cf. FIGS. 1-3). For example, initiation of movement of the conductive member 108 may be triggered by receipt by the control unit 203 of an indication or signal indicative of a failure or malfunction in the bypassable unit 201. The indication or signal indicative of a failure or malfunction in the bypassable unit 201 may for example be generated and transmitted to the control unit 203 by the sensing unit 202 or by some protection system (not shown in FIG. 4) included in the power transmission system 200.

In conclusion, there is disclosed a switch assembly for use in a circuit configured to carry a current between a first electrical conductor and a second electrical conductor. The switch assembly comprises at least a first current path and a second current path each of which includes an electrical contact which can be selectively connected to or disconnected from the second electrical conductor. At least one of the first current path and the second current path is configured such that it has a frequency-dependent reactance or impedance so as to force or cause current with a frequency which complies with a selected frequency criterion and which flows between the first electrical conductor and the second electrical conductor to flow, at least to a greater extent, via a selected one of the first current path and the second current path.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A switch assembly for use in a circuit between a first electrical conductor and a second electrical conductor, the circuit being configured to carry a current between the first electrical conductor and the second electrical conductor, the current having a variable frequency, wherein the switch assembly is arranged such that the first electrical conductor and the second electrical conductor can be selectively connected and disconnected such that when the first electrical conductor and the second electrical conductor are disconnected, current therebetween is interrupted and when the first electrical conductor and the second electrical conductor are connected, current is permitted to flow therebetween, the switch assembly comprising:
    at least a first current path and a second current path, wherein each of the first current path and the second current path includes an electrical contact which can be selectively connected to or disconnected from the second electrical conductor so as to permit current flowing between the first electrical conductor and the second electrical conductor to flow via one or both of the first current path and the second current path,
    wherein at least one of the first current path and the second current path is arranged such that it has a frequency-dependent reactance so as to force current with a frequency which complies with a selected frequency criterion and which flows between the first electrical conductor and the second electrical conductor to flow via a selected one of the first current path and the second current path at least to a greater extent than via the other one of the first current path and the second current path.

2. The switch assembly according to claim 1, wherein at least one of the first current path and the second current path is arranged such that it has a frequency-dependent reactance such that for current flowing between the first electrical conductor and the second electrical conductor having a frequency which complies with a selected frequency criterion the selected one of the first current path and the second current path has a higher impedance compared to the other one of the first current path and the second current path.

3. The switch assembly according to claim 1, wherein the current flowing between the first electrical conductor and the second electrical conductor has a frequency that varies at least during a time period, and wherein the at least one of the first current path and the second current path is arranged such that it has a frequency-dependent reactance such that when the frequency of the current flowing between the first electrical conductor and the second electrical conductor does not comply with the selected frequency criterion the current instead or also flows in the other one of the first current path and the second current path.

4. The switch assembly according to claim 1, further comprising:
    a movable, conductive member arranged in relation to the electrical contact of the first current path and the second current path, respectively, such that by movement of the conductive member the electrical contact of the first current path and the second current path, respectively, can be brought into or out of contact with the second electrical conductor so as to permit current flowing between the first electrical conductor and the second electrical conductor to flow via one or both of the first current path and the second current path.

5. The switch assembly according to claim 4, wherein the conductive member is movable between a first position and a second position such that in the first position, the electrical contacts of the first current path and the second current path are both out of contact with the second electrical conductor, and in the second position, the electrical contacts of the first current path and the second current path are both in contact with the second electrical conductor.

6. The switch assembly according to claim 5, wherein:
    at least one of the first current path and the second current path is arranged such that it has a frequency-dependent reactance so as to force current with a frequency which complies with the selected frequency criterion and which flows between the first electrical conductor and the second electrical conductor to flow via the first current path at least to the greater extent than via the second current path; and
    the conductive member is movable into a third, intermediate position between the first position and the second position such that the electrical contacts of the first current path and the second current path are in contact with the conductive member and on a condition that voltage between the electrical contact of the first current path and the second electrical conductor exceeds a predefined voltage level, an arc is generated between the electrical contact of the first current path and the second electrical conductor allowing electrical contact between the electrical contact of the first current path and the second electrical conductor via the arc.

7. The switch assembly according to claim 1, wherein the selected frequency criterion comprises the frequency exceeding a predefined frequency.

8. A power transmission system comprising:
    at least one bypassable unit; and
    a circuit arranged so as to selectively electrically bypass the at least one bypassable unit,
    wherein the circuit comprises:
        a first electrical conductor;
        a second electrical conductor; and
        the switch assembly according to claim 1 arranged between the first electrical conductor and the second electrical conductor, wherein the circuit is configured to carry a current between the first electrical conductor and the second electrical conductor, the current having a variable frequency.

9. The power transmission system according to claim 8, further comprising:
a control unit for controlling the switch assembly,
wherein the switch assembly further comprises a movable, conductive member arranged in relation to the electrical contact of the first current path and the second current path, respectively, such that by movement of the conductive member the electrical contact of the first current path and the second current path, respectively, can be brought into or out of contact with the second electrical conductor so as to permit current flowing between the first electrical conductor and the second electrical conductor to flow via one or both of the first current path and the second current path,
wherein the conductive member is movable between a first position and a second position such that in the first position, the electrical contacts of the first current path and the second current path are both out of contact with the second electrical conductor, and in the second position, the electrical contacts of the first current path and the second current path are both in contact with the second electrical conductor,
wherein the switch assembly is configured such that movement of the conductive member is controllable at least with respect to initiation of movement of the conductive member between the first position and the second position, and
wherein the control unit is configured to initiate movement of the conductive member responsive receiving an indication of a failure or malfunction in the bypassable unit.

10. The switch assembly according to claim 2, wherein the current flowing between the first electrical conductor and the second electrical conductor has a frequency that varies at least during a time period, and wherein the at least one of the first current path and the second current path is arranged such that it has a frequency-dependent reactance such that when the frequency of the current flowing between the first electrical conductor and the second electrical conductor does not comply with the selected frequency criterion the current instead or also flows in the other one of the first current path and the second current path.

11. The switch assembly according to claim 2, further comprising:
a movable, conductive member arranged in relation to the electrical contact of the first current path and the second current path, respectively, such that by movement of the conductive member the electrical contact of the first current path and the second current path, respectively, can be brought into or out of contact with the second electrical conductor so as to permit current flowing between the first electrical conductor and the second electrical conductor to flow via one or both of the first current path and the second current path.

12. The switch assembly according to claim 3, further comprising:
a movable, conductive member arranged in relation to the electrical contact of the first current path and the second current path, respectively, such that by movement of the conductive member the electrical contact of the first current path and the second current path, respectively, can be brought into or out of contact with the second electrical conductor so as to permit current flowing between the first electrical conductor and the second electrical conductor to flow via one or both of the first current path and the second current path.

13. The switch assembly according to claim 2, wherein the selected frequency criterion comprises the frequency exceeding a predefined frequency.

14. The switch assembly according to claim 3, wherein the selected frequency criterion comprises the frequency exceeding a predefined frequency.

15. The switch assembly according to claim 4, wherein the selected frequency criterion comprises the frequency exceeding a predefined frequency.

16. The switch assembly according to claim 5, wherein the selected frequency criterion comprises the frequency exceeding a predefined frequency.

17. The switch assembly according to claim 6, wherein the selected frequency criterion comprises the frequency exceeding a predefined frequency.

18. A power transmission system comprising:
at least one bypassable unit; and
a circuit arranged so as to selectively electrically bypass the at least one bypassable unit,
wherein the circuit comprises:
a first electrical conductor;
a second electrical conductor; and
the switch assembly according to claim 2 arranged between the first electrical conductor and the second electrical conductor,
wherein the circuit is configured to carry a current between the first electrical conductor and the second electrical conductor, the current having a variable frequency.

19. A power transmission system comprising:
at least one bypassable unit; and
a circuit arranged so as to selectively electrically bypass the at least one bypassable unit,
wherein the circuit comprises:
a first electrical conductor;
a second electrical conductor; and
the switch assembly according to claim 3 arranged between the first electrical conductor and the second electrical conductor,
wherein the circuit is configured to carry a current between the first electrical conductor and the second electrical conductor, the current having a variable frequency.

20. A power transmission system comprising:
at least one bypassable unit; and
a circuit arranged so as to selectively electrically bypass the at least one bypassable unit,
wherein the circuit comprises:
a first electrical conductor;
a second electrical conductor; and
the switch assembly according to claim 4 arranged between the first electrical conductor and the second electrical conductor,
wherein the circuit is configured to carry a current between the first electrical conductor and the second electrical conductor, the current having a variable frequency.

* * * * *